(12) United States Patent
Klicpera et al.

(10) Patent No.: US 12,483,781 B2
(45) Date of Patent: Nov. 25, 2025

(54) POWER MANAGER TO SUPPORT LESS-THAN-NOMINAL CONDITIONS IN A MACHINE VISION SYSTEM

(71) Applicant: ZEBRA TECHNOLOGIES CORPORATION, Lincolnshire, IL (US)

(72) Inventors: Christopher P. Klicpera, Westbury, NY (US); Nina Feinstein, Hicksville, NY (US); Matthew Lawrence Horner, Sound Beach, NY (US); Thomas Fitzgerald, Coventry, CT (US); John P. Evans, Levittown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 650 days.

(21) Appl. No.: 17/380,880

(22) Filed: Jul. 20, 2021

(65) Prior Publication Data

US 2022/0353412 A1 Nov. 3, 2022

Related U.S. Application Data

(60) Provisional application No. 63/182,571, filed on Apr. 30, 2021.

(51) Int. Cl.
*H04N 23/65* (2023.01)
*H04N 23/73* (2023.01)

(52) U.S. Cl.
CPC ........... *H04N 23/651* (2023.01); *H04N 23/73* (2023.01)

(58) Field of Classification Search
CPC ...... H04N 23/65; H04N 23/73; H04N 23/631; H04N 23/651; H04N 23/62
See application file for complete search history.

(56) References Cited

U.S. PATENT DOCUMENTS

| 6,031,999 A | * | 2/2000 | Ogawa ..................... G03B 7/26 396/303 |
| 6,434,337 B1 | * | 8/2002 | Misawa ............... H04N 23/634 396/303 |
| 7,808,548 B1 | | 10/2010 | Popescu-Stanseti et al. |
| 11,070,733 B2 | * | 7/2021 | Ohtsuka ............... H04N 23/633 |

(Continued)

OTHER PUBLICATIONS

International Search Report and Written Opinion for International Application No. PCT/US2022/25796 mailed on Aug. 19, 2022.

*Primary Examiner* — Paul M Berardesca

(57) ABSTRACT

An example method for managing power within an imaging device includes: determining an interface of the imaging device via which the imaging device is receiving power; based on the interface, determining a power budget associated with the interface; determining which fixed load components of the imaging device are enabled; calculating a remaining power budget by subtracting a power consumption of the enabled fixed load components from the power budget; responsive to the remaining power budget being positive, configuring non-fixed load components such that a total power consumption of the non-fixed load components does not exceed the remaining power budget; and responsive to the remaining power budget being negative, providing, via a user interface, a notification of insufficient power budget.

20 Claims, 7 Drawing Sheets

(56) References Cited

U.S. PATENT DOCUMENTS

| | | | |
|---|---|---|---|
| 2006/0257135 A1* | 11/2006 | Kawada | H04N 23/65 |
| | | | 348/E5.042 |
| 2008/0037979 A1 | 2/2008 | Guthrie et al. | |
| 2008/0062284 A1* | 3/2008 | Fujio | H04N 23/631 |
| | | | 348/E9.053 |
| 2009/0113221 A1* | 4/2009 | Holle | G06F 1/189 |
| | | | 713/310 |
| 2011/0310270 A1* | 12/2011 | Gladnick | G01N 21/8806 |
| | | | 348/E5.037 |
| 2012/0254633 A1 | 10/2012 | Vilhauer et al. | |
| 2013/0314556 A1* | 11/2013 | Ikegami | H04N 23/661 |
| | | | 348/207.11 |
| 2015/0181117 A1* | 6/2015 | Park | H04N 5/63 |
| | | | 348/372 |
| 2016/0065844 A1* | 3/2016 | Yao | H04N 23/65 |
| | | | 348/207.11 |
| 2018/0359424 A1* | 12/2018 | Shibusawa | H04N 23/74 |
| 2020/0134773 A1* | 4/2020 | Pinter | G01N 21/8806 |
| 2020/0275025 A1* | 8/2020 | El Kolli | G06F 1/26 |
| 2020/0326740 A1* | 10/2020 | Ataee | H04L 12/10 |

\* cited by examiner

POWER MANAGER TO SUPPORT LESS-THAN-NOMINAL CONDITIONS IN A MACHINE VISION SYSTEM

CROSS-REFERENCE TO RELATED APPLICATIONS

This application claims priority from provisional U.S. Patent Application Ser. No. 63/182,571, filed on Apr. 30, 2021, and incorporated herein by reference in its entirety.

BACKGROUND

Over the years, industrial automation has come to rely heavily on machine vision components capable of assisting operators in a wide variety of tasks. In some implementations machine vision components, like cameras, are utilized to analyze objects including objects moving on a conveyor belt past stationary cameras.

Due to a wide variety of applications that these cameras may be used in, it is difficult to predict precise power consumption figures. The power requirements of a camera, for example, may vary significantly based on the configuration settings of the camera and additional input/output devices coupled to the camera. Moreover, due to infrastructure limitations, power supply options may be limited. Different power supplies may be capable of delivering different amounts of power. Consequently, there exists a need for devices, systems, and methods that address power management within machine vision systems.

SUMMARY

In an embodiment, the present invention is a method for managing power within an imaging device. The method comprises: determining an interface of the imaging device via which the imaging device is receiving power; based on the interface, determining a power budget associated with the interface; determining which fixed load components of the imaging device are enabled; calculating a remaining power budget by subtracting a power consumption of the enabled fixed load components from the power budget; responsive to the remaining power budget being positive, configuring one or more non-fixed load components such that a total power consumption of the non-fixed load components does not exceed the remaining power budget; and responsive to the remaining power budget being negative, providing, via a user interface, a notification of insufficient power budget.

In a variation of this embodiment, determining the interface includes determining the interface at power up of the imaging device.

In another variation of this embodiment, determining the power budget includes, responsive to determining that the interface is an external power supply interface, measuring a voltage of the interface.

In yet another variation of this embodiment, configuring the one or more non-fixed load components includes configuring an illumination assembly of the imaging device. Configuring the illumination assembly may include: determining a combination of settings including an exposure time, a number of activated light sources, and an intensity of the illumination assembly such that the total power consumption does not exceed the remaining power budget; and varying the illumination assembly, via a controller, in accordance with the combination of settings. Depending on the implementation, determining the combination of settings may include: (i) leaving one or two of the exposure time, the number of activated light sources, or the intensity fixed, or (ii) receiving a selection of one or two of the exposure time, the number of activated light sources, or the intensity via the user interface, and, responsive to the selection, determining the combination of settings leaving the one or two of the exposure time, the number of activated light sources, or the intensity fixed. The method may further include providing, at the user interface, an indication of the combination of settings.

Configuring the illumination assembly may include determining a maximum exposure time of the illumination assembly, a maximum number of light sources of the illumination assembly that can be activated, and/or a maximum intensity of the illumination assembly based on the remaining power budget. Configuring the illumination assembly in such implementations may include preventing the illumination assembly from operating with an exposure time, number of light sources, or intensity exceeding the maximum exposure time, maximum number of light sources, or maximum intensity, respectively. The method may further include providing, via the user interface, an indication of the maximum exposure time, maximum number of light sources, and/or maximum intensity.

In yet another variation of this embodiment, the method further includes detecting a change in the enabled fixed load components and, responsive to the detecting, recalculating the remaining power budget.

In a further variation of this embodiment, determining which fixed load components are enabled may include (i) determining whether one or more of an ethernet port, a Universal Serial Bus (USB) port, a display port, or a General Purpose Input/Output (GPIO) port are in a connected state, and/or (ii) determining which sensors of the imaging device are enabled.

In another embodiment, the present invention is a system comprising an imaging device and a computing device implementing a user interface and communicatively coupled to the imaging device. The imaging device may be configured to: determine an interface of the imaging device via which the imaging device is receiving power; based on the interface, determine a power budget associated with the interface; determine which fixed load components of the imaging device are enabled; calculate a remaining power budget by subtracting a power consumption of the enabled fixed load components from the power budget; responsive to the remaining power budget being positive, configure one or more non-fixed load components such that a total power consumption of the non-fixed load components does not exceed the remaining power budget; and responsive to the remaining power budget being negative, transmit an indication to the computing device to cause the user interface to display a notification of insufficient power budget.

In yet another embodiment, the present invention is an imaging device comprising one or more processors. The imaging device may be configured to: determine an interface of the imaging device via which the imaging device is receiving power; based on the interface, determine a power budget associated with the interface; determine which fixed load components of the imaging device are enabled; calculate a remaining power budget by subtracting a power consumption of the enabled fixed load components from the power budget; responsive to the remaining power budget being positive, configure one or more non-fixed load components such that a total power consumption of the non-fixed load components does not exceed the remaining power budget; and responsive to the remaining power budget being negative, transmit a notification of insufficient power budget to a computing device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
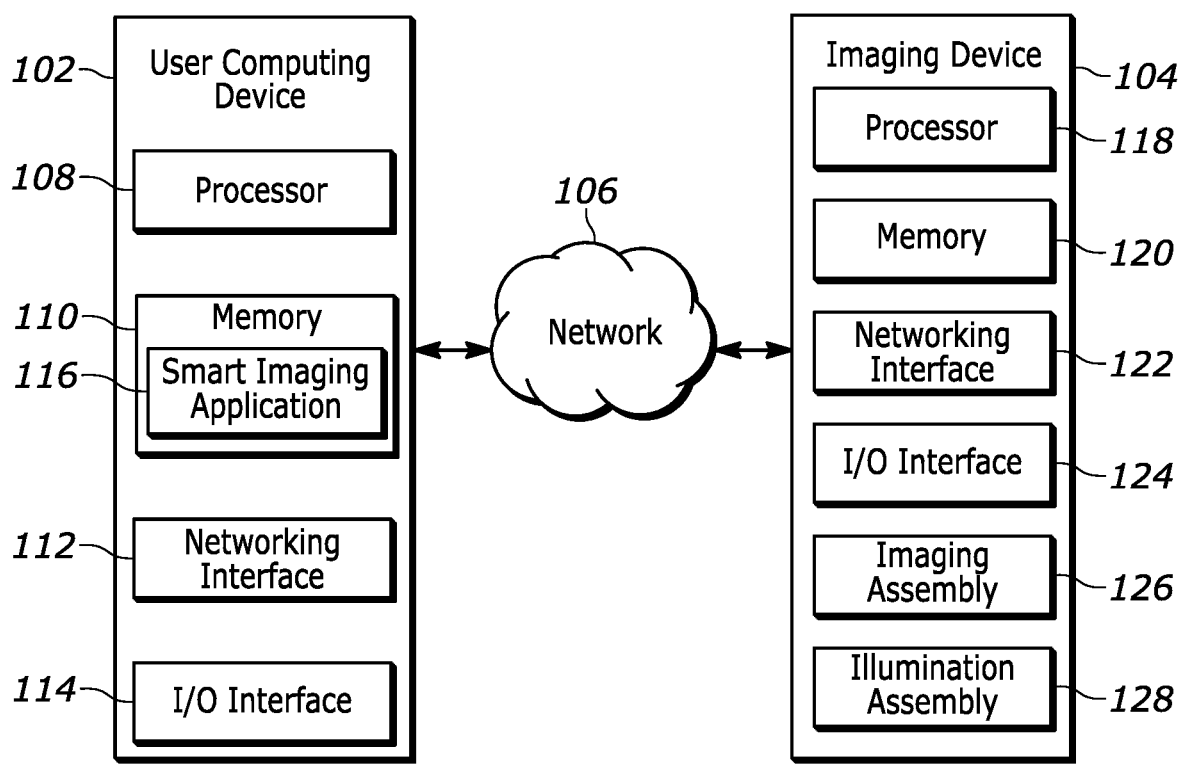
FIG. 1 illustrates a block diagram of an example system for implementing the example methods and/or operations described herein, including methods for managing power of an imaging device in a machine vision system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A system of this disclosure can implement techniques for managing power within an imaging device. An example imaging device may have more than one interface, where each interface is capable of providing a different power budget to the imaging device. For example, under preferred circumstances, the imaging device may be powered by a dedicated power supply sufficient to maintain all systems of the imaging device at any setting or operational mode. However, the imaging device may receive power from other interfaces, such as over a Universal Serial Bus (USB) port (e.g., a USB-A or a USB-C port), or via Power over Ethernet (PoE), having a limited power supply compared to a dedicated power supply. If the current drawn by the imaging device exceeds the total power budget of the imaging device, various functionalities of the imaging device, including core functions such as power to central processing units (CPUs) of the imaging device, may fail. Such failures can damage the imaging device and/or cause an imaging job performed by the imaging device to unexpectedly stop, resulting in user confusion. Further, functionalities of the imaging device may fail in an unpredictable fashion, such that it is not clear which functionality will fail given a change in the power budget of the imaging device.

Advantageously, an imaging device configured to implement the techniques of this disclosure detects the power budget available to the imaging device and responds accordingly in order to remain operative despite receiving less-than-optimal power. In particular, the imaging device subtracts, from the power budget, power consumption of fixed load components (e.g., loads corresponding to CPU(s), a graphical processing unit(s) (GPU(s)), General Purpose Input/Output (GPIO) port(s), Universal Serial Bus (USB) port(s), ethernet port(s), display port(s), enabled sensors, etc.) to calculate a remaining power budget. The imaging device can then configure non-fixed load components such that a total power consumption of the non-fixed load components does not exceed the remaining power budget. If the remaining power budget is less than zero, however, the imaging device can provide, via a user interface, a notification to the user indicating insufficient power budget. To provide the notification, the imaging device can transmit the notification to a computing device communicatively coupled to the imaging device, the computing device implementing an application for managing the imaging device. The application may provide graphical user interfaces enabling a user to view a status of the imaging device, configure the imaging device, and view output from the imaging device. Responsive to receiving the notification from the imaging device, the application can display the notification on such a graphical user interface. Thus, the disclosed techniques also reduce user confusion by notifying a user when power is insufficient for a given application.

More specifically, an example non-fixed load component that the imaging device can configure based on the remaining power budget is an illumination assembly of the imaging device. The imaging device can adjust illumination assembly settings, such as the exposure time (e.g., an amount of time for which the illumination assembly may be activated during each frame), number of activated light sources (e.g., a number of light emitting diodes (LEDs)), and/or intensity such that the total power consumption of the non-fixed load components does not exceed the remaining power budget. Further, the imaging device can notify, via a user interface, the user of updated settings and/or updated maximum limits calculated based on the remaining power budget. Thus, imaging device makes the user aware of the allowed configuration settings of the imaging device, such that the user can adjust the configuration within these allowed limits.

FIG. 1 illustrates an example imaging system 100 configured to analyze pixel data of an image of a target object to execute a machine vision job, in accordance with various embodiments disclosed herein. In the example embodiment of FIG. 1, the imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. The user computing device 102 is generally configured to enable a user/operator to interact with the imaging device 104, e.g., by enabling the user/operator to create a machine vision job for execution on the imaging device 104, view/modify settings of the imaging device 104, and view notifications/messages from the imaging device 104. After creating a machine vision job or modifying the settings of the imaging device 104, the user/operator may then transmit/upload the machine vision job or modified settings to the imaging device 104 via the network 106. The imaging device 104 can then interpret and execute the machine vision job or apply the modified settings. The user computing device 102 may comprise one or more operator workstations, and may include one or more processors 108, one or more memories 110, a networking interface 112, an input/output (I/O) interface 114, and a smart imaging application 116.

The imaging device 104 is connected to the user computing device 102 via a network 106, and is configured to interpret and execute machine vision jobs received from the user computing device 102 and to operate in accordance with settings received from the user computing device 102 (provided the settings are within total power budget limits, as will be described below). Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an I/O interface 124, an imaging assembly 126, and an illumination assembly 128. The imaging assembly 126 may include a digital camera and/or digital video camera for capturing or taking digital images and/or frames. Each digital image may comprise pixel data that may be analyzed by one or more tools each configured to perform an image analysis task. The digital camera and/or digital video camera of, e.g., the imaging assembly 126 may be configured, as disclosed herein, to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

The imaging assembly 126 may include imaging sensors, which may include one or more types of imaging sensors. For example, the imaging sensors may include charge-coupled device (CCD) sensors, complementary metal oxide semiconductor (CMOS) sensors, or other types of sensors. Further, the imaging sensors may include monochrome and/or color sensors, and may have different resolution and frame rate capabilities.

The imaging device 104 further includes an illumination assembly 128. All or part of the illumination assembly 128 may be included in the imaging assembly 126. The illumination assembly 128 includes one or more illumination sources providing illumination for the imaging assembly 126 (e.g., illumination directed towards the imaging FOV of the imaging device 104). The illumination assembly 128 may include a plurality of light sources (e.g., light LEDs), which may be activated or not activated depending on the application. Further, the plurality of light sources may include sources of white light (e.g., light that includes wavelengths across the visible spectrum) and/or light sources emitting at different wavelengths, such as a red light source, a green light source, a blue light source, and/or an infrared source. Settings of the illumination assembly 128 include an exposure time of the illumination assembly 128, a number of activated light sources of the illumination assembly 128, and a brightness or intensity of the illumination assembly 128. Such settings are configurable by a user interacting with the smart imaging application 116 (e.g., such settings may be configured by the user and saved as part of a job file), and/or may be configured by the imaging device 104 in accordance with a machine vision job and/or the power budget for the illumination assembly 128, as will be described in further detail below.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the smart imaging application 116, which may be configured to enable machine vision job construction, as described further herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, where each may be configured to facilitate their various functionalities discussed herein. It should be appreciated that one or more other applications may be envisioned and that are executed by the one or more processors 108, 118.

In particular, the smart imaging application 116 may display graphical user interfaces (GUIs) via which a user can view and edit machine vision jobs and configurations of the imaging device 104, and view images captured by the imaging device 104. The imaging device 104 may transmit notifications regarding an active machine vision job or current configuration settings to the user computing device 102 via the network 106.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein. The one or more processors 108 and the memory 110, for example, may be included in a controller of the user computing device 102, and the one or more processors 118 and the memory 120 may similarly be included in a controller of the imaging device 104. The controller of the imaging device 104, for example, may control operation of the imaging assembly 126 and the illumination assembly 128.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein. As one example, the networking interfaces 112, 122 may include ethernet port(s), which may be capable of delivering power to the user computing device 102 or the imaging device 104, respectively, in addition to providing a communicative connection to a network.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. For example, the I/O interfaces 114, 124 may include USB ports and/or GPIO ports facilitating exchange of information with external devices. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
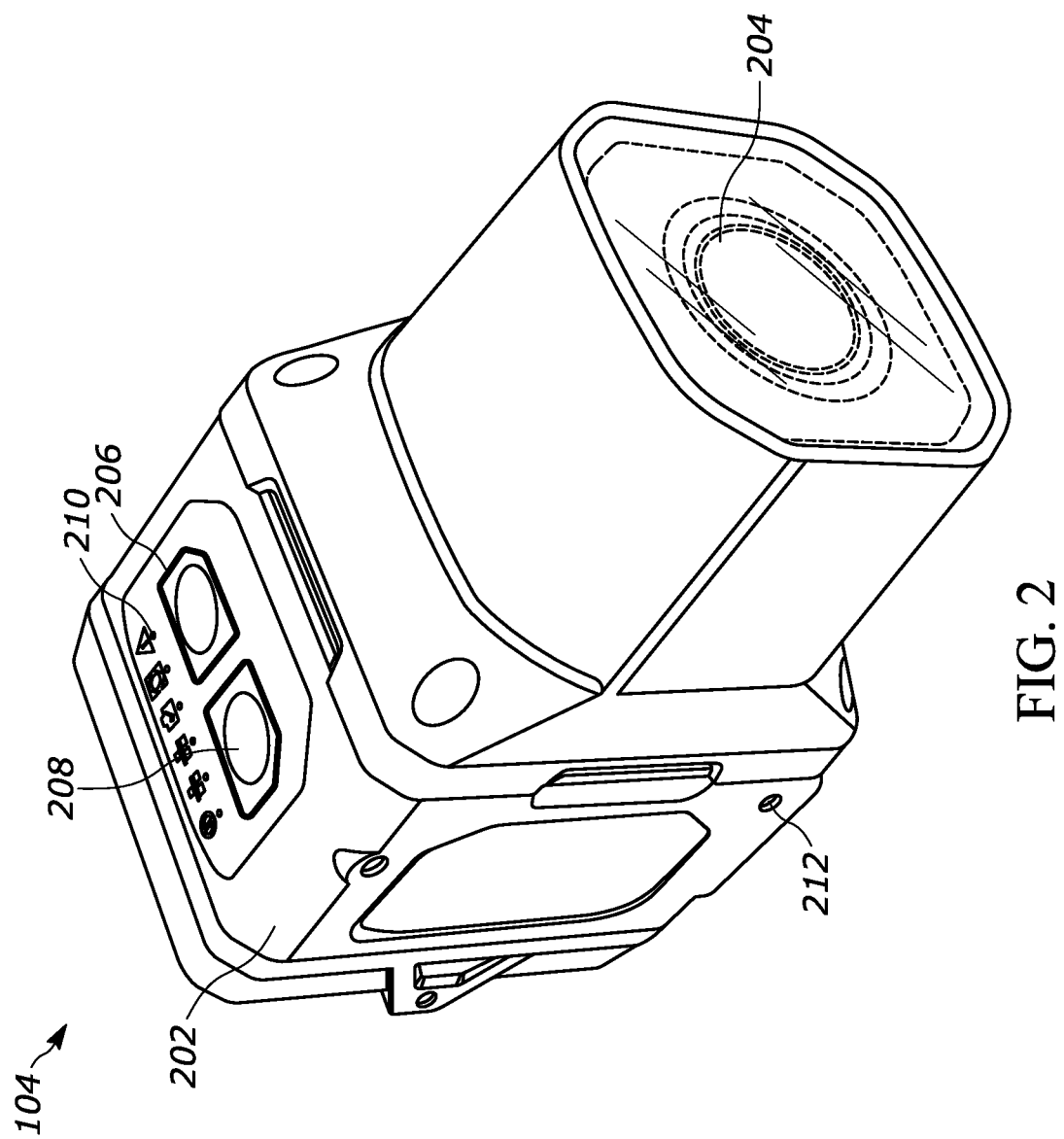
FIG. 2 is a perspective view of an example imaging device that may be included in the system of FIG. 1.

FIG. 2 is a perspective view of the imaging device 104 of FIG. 1, in accordance with embodiments described herein. The imaging device 104 includes a housing 202, an imaging aperture 204, a user interface label 206, a dome switch/button 208, one or more indicator LEDs 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. In addition, the imaging device 104 may be configured to automatically adjust its own configuration in order to keep the imaging device 104 within a power budget, where the power budget for the imaging device 104 may be determined using the methods described with reference to FIGS. 3 and 5. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204. As another example, the device configuration settings may include instructions to adjust one or more settings (e.g., exposure time, number of activated light sources, intensity) related to the illumination assembly 128 of the imaging device 104 (not shown in FIG. 2).

The user interface label 206 may include the dome switch/button 208 and one or more indicator LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more indicator LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., a GUI of the smart imaging application 116). The imaging configuration screen may allow the user to configure one or more configurations of the imaging device 104 (e.g., aperture size, exposure time, etc.) that may be stored in memory (e.g., one or more memories 110, 120) for use in later developed machine vision jobs, as discussed herein. Example imaging configuration screens are discussed in further detail below with respect to FIGS. 4A-4C.

To further this example, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user to connect and/or removably affix the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 3:
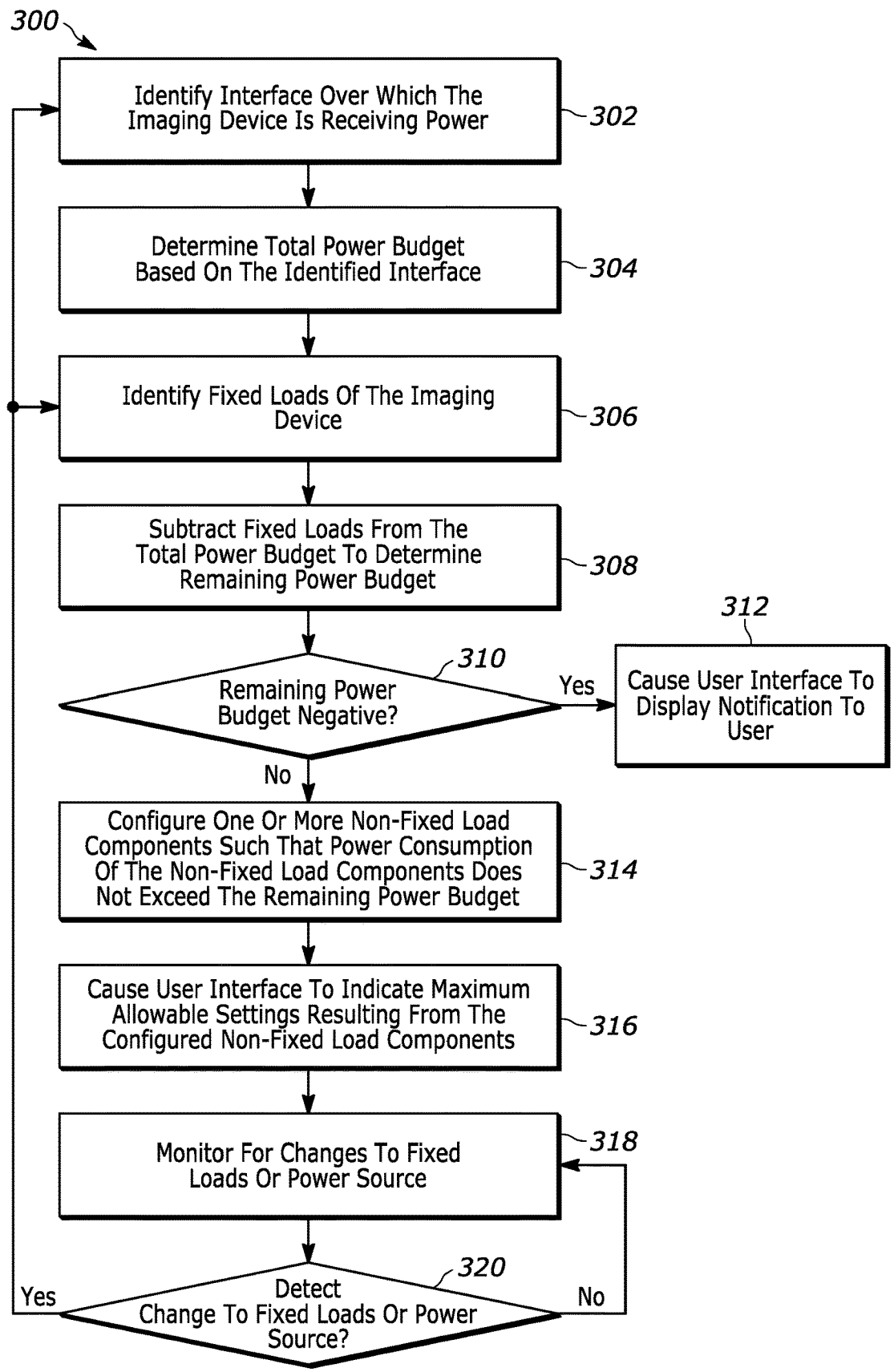
FIG. 3 illustrates a flow diagram of an example method for managing power of an imaging device, which can be implemented by system of FIG. 1.

FIG. 3 illustrates a flow diagram of an example method 300 for managing power of an imaging device (e.g., the imaging device 104). The method 300 can be implemented on the imaging device 104 by the processor 118, for example, or by the imaging device 104 operating in conjunction with the user computing device 102.

At block 302, the imaging device 104 identifies an interface over which the imaging device 104 is receiving power (i.e., an input power source of the imaging device 104). The imaging device 104 may have multiple ports via which the imaging device is configured to receive power, such as one or more ethernet port(s) via which the imaging device 104 can receive power in accordance with the PoE or PoE+ protocol, one or more USB port(s) (e.g., USB-A, USB-C), or a direct current (DC) external power supply port (e.g., via which the imaging device 104 can connect to a 24 volt (V) DC power supply). The imaging device 104 determines the interface over which the imaging device 104 is receiving an active supply of power. In the case of an Ethernet port or a USB port, respectively, the imaging device 104 can determine the type of ethernet port (e.g., whether the port is configured in accordance with PoE or PoE+) or the type of USB port (e.g., whether the port is a USB-A port or a USB-C port, whether the port is a standard downstream USB port or a high-power USB port, or a USB specification to which the USB port conforms).

The imaging device 104 may determine the interface upon power up or start-up of the imaging device 104. As will be discussed below, the imaging device 104 may continue to monitor the interface after start-up in order to identify occurrences when the input power source of the imaging device 104 changes.

At block 304, based on the identified interface, the imaging device 104 determines the total power budget for the imaging device 104. The total power budget is the power that the imaging device 104 receives via the interface. All loads, both fixed and non-fixed, of the imaging device 104 therefore should be equal to or below the total power budget of the imaging device 104 in order for the imaging device 104 to maintain operation.

In some implementations, in order to determine the total power budget, the imaging device 104 utilizes a lookup table, which may be stored at the memory 120. The lookup table indicates a total power budget for each interface over which the imaging device 104 can receive power. Additionally or alternatively, the imaging device 104 may measure the power that the imaging device 104 is receiving via the identified interface, and determine the total power budget based on the measured power. The imaging device 104 may measure the voltage and/or current at the interface, for example. In some implementations, the imaging device 104 measures the voltage at the interface responsive to determining that the interface is an external power supply interface. While in some instances an external power supply may be able to provide sufficient power for all systems, this is not always the case. As such, even upon detecting that the interface used to power the imaging device 104 is the external power supply interface, the imaging device 104 may determine the power budget by measuring a voltage at the interface.

Next, at block 306, the imaging device 104 identifies the fixed loads of the imaging device, where a load refers to the power consumed by a particular device or component. Fixed loads are those loads drawn by fixed load components. Non-fixed loads are those loads drawn by non-fixed load components. Thus, to identify the fixed loads at block 306, the imaging device 104 determines which fixed load components of the imaging device are enabled. In contrast to non-fixed load components, fixed load components include those components for which the imaging device 104 does not automatically adjust the load (i.e., the power drawn by the component) based on the total power budget for the imaging device. The loads drawn by fixed load components therefore may be those loads critical to operation of the imaging device 104 (e.g., a CPU), and/or loads that the imaging device 104 is preconfigured not to modify based on the implementation. Generally speaking, a fixed load components may be the processor 118, where processor 118 may draw power for functions related to active CPU, GPU, and digital signal processing (DSP) cores and clock frequencies. Fixed load components may also include sensors of the imaging assembly 126, such as imaging sensors including color and/or monochrome sensors. Identifying fixed loads may also include determining which ports (e.g., ports of the networking interface 122 and the I/O interface 124) of the imaging device 104 are in a connected state, such as an ethernet port, a USB port, a display port, or a GPIO port. For example, the imaging device 104 may determine whether any peripheral devices are connected to ports of the imaging device 104. Thus, the imaging device 104 can determine which fixed load components are enabled and the power associated with each of the fixed load components. In some instances, a GPIO interface may be considered a non-fixed load component rather than a fixed load component.

At block 308, the imaging device 104 subtracts a power consumption of the fixed load components (i.e., the fixed loads) determined at block 306 from the total power budget determined at block 304. The resulting quantity is equal to a remaining power budget. This remaining power budget is the power available for non-fixed load components (i.e., those components which the imaging device 104 can configure in order to keep the total power consumed by the imaging device 104 from exceeding the total power budget).

At block 310, the imaging device 104 determines whether the remaining power budget is negative. If so, then the flow proceeds to block 312, where the imaging device 104 causes a user interface to display a notification to a user of the imaging device 104. For example, the imaging device 104 may transmit a notification of insufficient power budget to the user computing device 102 via the network 106. The user computing device 102 can then display the notification or an indication of the notification within a GUI of the smart imaging application 116 (e.g., a GUI presented on a display screen of the I/O interface 114). The notification indicates to a user that the power source is insufficient for the imaging device 104 to operate. Depending on the implementation, the imaging device 104 may cause the user computing device 102 to emit an audio notification instead of or in addition to displaying the notification.

If the remaining power budget is not negative (i.e., positive or zero), then the flow proceeds to block 314. At block 314, the imaging device 104 configures one or more non-fixed components such that power consumption of the non-fixed load components does not exceed the remaining power budget. The non-fixed load components may include the illumination assembly 128 of the imaging device 104. In some implementations, the non-fixed load components include one or more GPIO interfaces of the imaging device 104. In such implementations, configuring a non-fixed load component may include adjusting the current to a GPIO interface to keep the non-fixed loads within the remaining power budget. In the event that the remaining power budget is zero, then no power is available for non-fixed load components. In such a case, the imaging device 104 may turn off the illumination assembly 128 and any other non-fixed load components, and may cause the user interface to display a notification that no power is available for non-fixed load components.

In implementations where the non-fixed load components include the illumination assembly 128, configuring the non-fixed load components may include determining a combination of settings for the illumination assembly 128 such that the load drawn by the illumination assembly is within the remaining power budget. Example settings of the illumination assembly 128 include exposure time, number of activated light sources, and intensity of the illumination assembly 128. Thus, the imaging device 104 may determine a combination of exposure time, number of activated light sources, and intensity such that the power consumption of the non-fixed load components does not exceed the remaining power budget. In some implementations, the imaging device 104 fixes (i.e., keeps constant) one or more of the settings of the illumination assembly 128, and varies the remaining settings. The imaging device 104 may be preconfigured to fix a particular setting or combination of settings (e.g., based on a configuration stored at the memory 120). Additionally or alternatively, a user can select a setting or combination of settings via a user interface of the smart imaging application 116). The imaging device 104 can then vary the remaining settings while keeping the user-selected setting or combination of settings fixed.

After determining the combination of settings of the illumination assembly 128 that will keep the load of the illumination assembly 128 within the remaining power budget, the imaging device 104 can transmit an indication of the combination of settings to the user computing device 102 for display to the user. Further, the imaging device 104 can automatically vary the settings at the imaging device 104 to be the determined combination.

In some implementations, configuring the non-fixed load components includes determining maximum allowable settings for one or more of the settings based on the remaining power budget. For example, the imaging device 104 may determine a maximum exposure time, a maximum number of light sources that can be activated, and/or a maximum intensity of the illumination assembly. The imaging device 104 can then prevent the illumination assembly 128 from operating with a setting above the corresponding maximum setting. In some implementations, a controller of the imaging device 104 prevents the illumination assembly 128 from operating with settings above the maximum settings. Additionally or alternatively, the imaging device 104 may prevent a user from selecting settings above the determined maximum settings.

Particularly, at block 316, the imaging device 104 causes the user interface to indicate the maximum allowable settings resulting from the configured non-fixed load components. For example, a user interface of the smart imaging application 116 may remove or block user-selectable options for selecting settings above the maximum allowable settings. Example user interfaces are discussed below with reference to FIGS. 4A-4C. The user interface may also display a notification that the setting options are limited due to the power available to the imaging device 104.

In some implementations, the imaging device 104 may allow a user to select a setting that exceeds the maximum setting, but, in operation, also adjusts non-fixed loads such that the remaining power budget is not exceeded. For example, generally speaking, the exposure time corresponds to the time that the illumination assembly 128 is activated. However, if a user selects an exposure time that exceeds the maximum determined exposure time, the imaging device 104 may only activate the illumination assembly 128 for the maximum exposure time. For example, if the maximum exposure time is 0.01 seconds, but the user selects an exposure time of 0.03 seconds, images may be captured with the illumination assembly 128 activated for 0.01 seconds and deactivated for the remaining 0.02 seconds of the frame. Thus, the illumination assembly 128 may be activated and deactivated during the same frame. The imaging device 104 may cause the user interface to present a notification that selecting such an exposure time may cause the illumination assembly 128 to be activated and deactivated during the same frame.

The method 300 also includes a feedback mechanism. Thus, at block 318, the imaging device 104 monitors for changes to the fixed loads or to the power source. At block 320, if the imaging device 104 detects a change to the fixed loads or to the power source, then the flow proceeds back to block 302. If the imaging device 104 detects a change to the fixed loads, the imaging device 104 can either return to block 302, or return to block 306, provided the interface remains the same. If, at block 320, the imaging device 104 does not detect a change to the fixed loads or to the power source, then the flow can return back to block 318. Accordingly, if the imaging device 104 detects changes to either or both of the fixed loads or the power source, the imaging device 104 can automatically recalculate the remaining power budget and configure non-fixed load components in accordance with the recalculated power budget.

It should also be noted that blocks 302-316 may be performed as part of a boot-up or start-up process of the imaging device 104. For example, upon initialization of the imaging device 104, the imaging device 104 identifies the interface over which the imaging device 104 is receiving power (block 302), and proceeds with the remaining steps of the method 300.

Figure 4A:
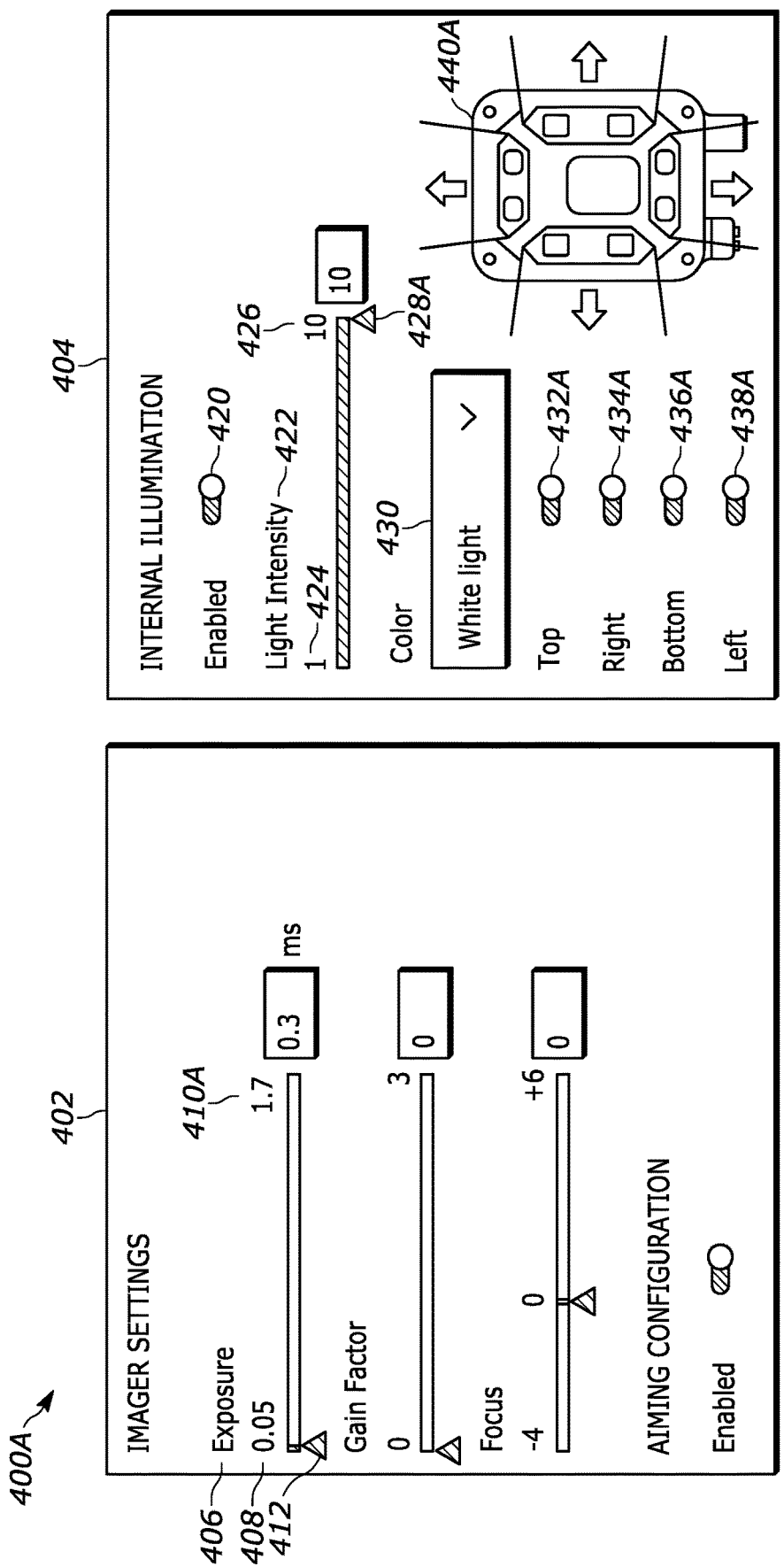
FIGS. 4A-4C illustrate example graphical user interfaces utilized to manage an imaging device, in accordance with embodiments described herein.
Figure 4B:
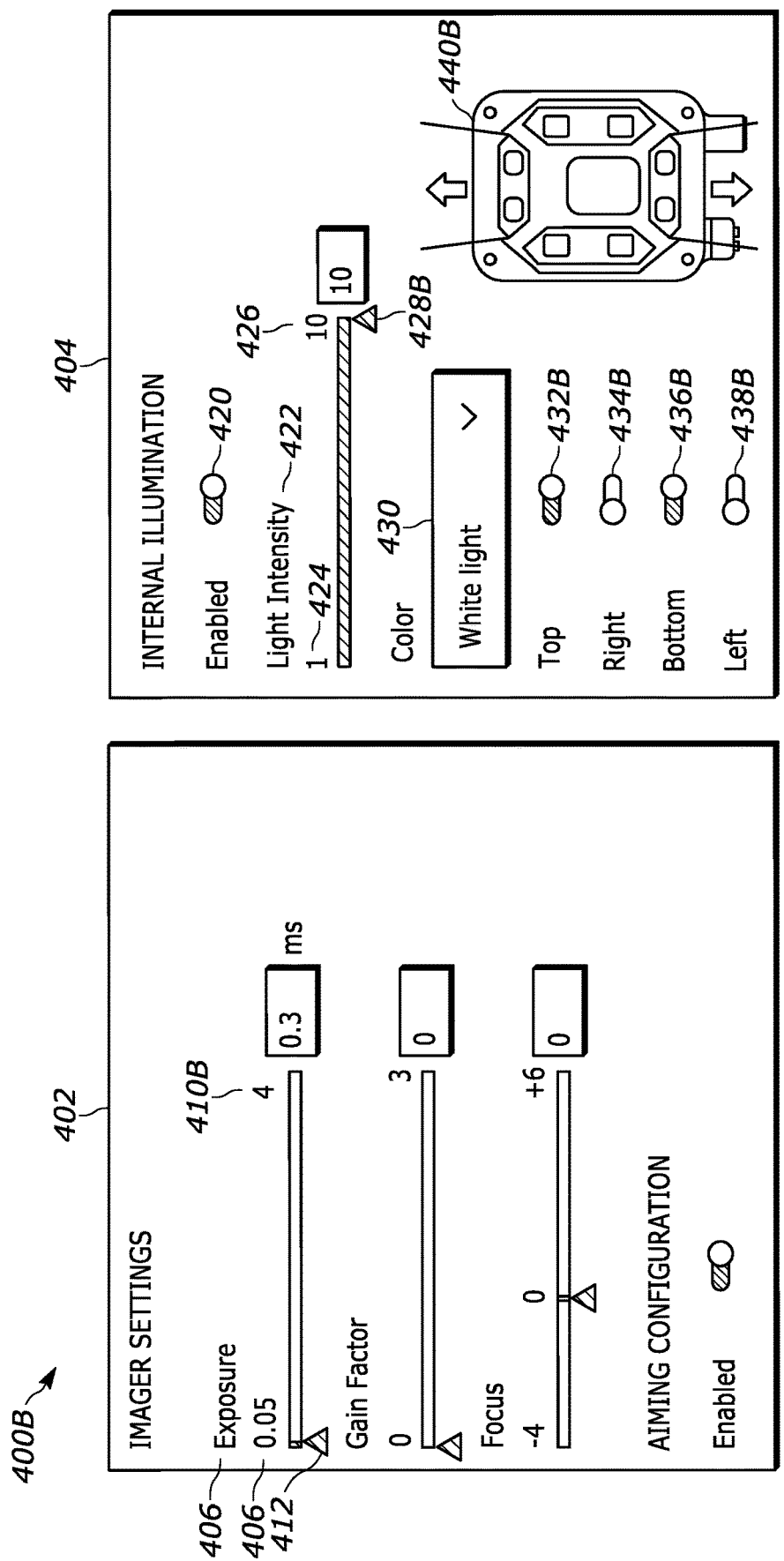
Figure 4C:
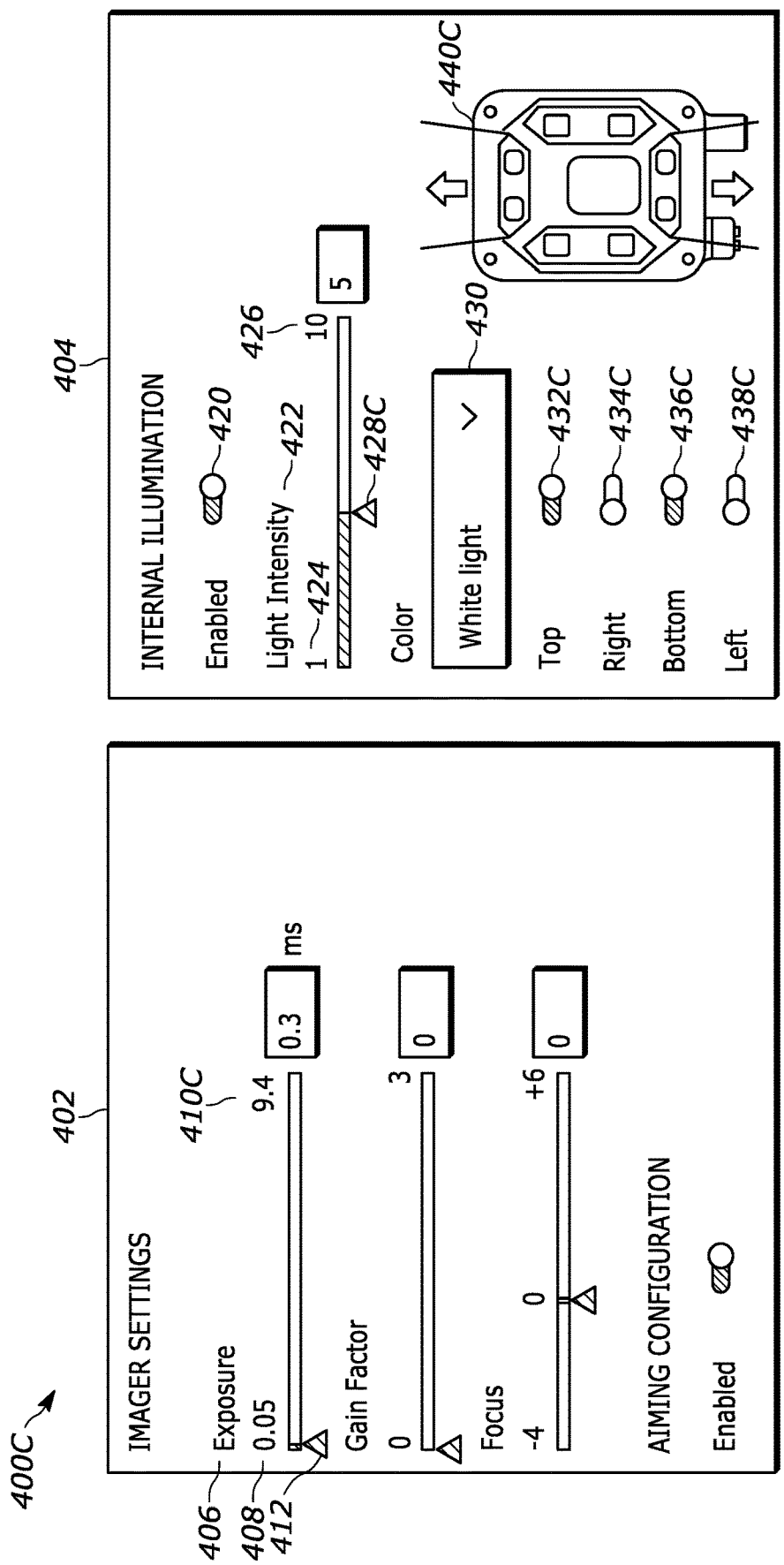

Turning to FIGS. 4A-4C, the smart imaging application 116 may display imaging configuration screens (i.e., graphical user interfaces (GUIs)) including user-selectable options for configuring the imaging device 104. Elements labeled with the same reference numbers in FIGS. 4A-4C correspond to the same element. Accordingly, FIGS. 4A-4C may represent the same imaging configuration screen as it appears after different user selections. The smart imaging application 116 may present the imaging configuration screens during job configuration (e.g., to enable a user to select device configuration settings for the imaging device 104 for a particular machine vision job that the user can save and deploy to the imaging device 104 for execution). Additionally or alternatively, the smart imaging application 116 may present the imaging configuration screens to enable a user to change current device configuration settings of the imaging device 104. Thus, device configuration settings of the imaging device 104 that the user configures using the imaging configuration screens may be stored and later deployed to the imaging device 104, or directly applied in real-time to the imaging device 104. In either case, the imaging device 104 can communicate with the user computing device 102 in order to receive user selections of configuration settings of the imaging device 104, determine whether such user selections allow the imaging device 104 to operate given the power budget of the imaging device 104, and transmit notifications to the imaging device 104 for display.

Referring first to FIG. 4A, a first imaging configuration screen 400A may include an imager setting menu 402 and an internal illumination menu 404. The imager setting menu 402 includes an exposure setting 406. A user can interact with a slider 412 to set an exposure time of the imaging device 104. A user can move the location of the slider 412 from a minimum exposure time 408 to a maximum exposure time 410A, which correspond to 0.05 and 1.7 ms in FIG. 4A. The slider 412 indicates a selected exposure time of 0.3 ms.

The imager setting menu 402 may include other settings in addition to the exposure setting 406, such as a gain factor, a focus, and aiming configuration enablement.

The internal illumination menu 404 includes a user-selectable option 420 to enable the internal illumination (i.e., the illumination assembly 128) of the imaging device 104. The internal illumination menu 404 includes a light intensity setting 422. A user can interact with a slider 428A to set an intensity of the imaging device 104. A user can move the location of the slider 428A from a minimum intensity 424 to a maximum intensity 426, which correspond to 1 and 10 in FIG. 4A. Intensity, for example, may be defined on a scale from 1 to 10. In FIG. 4A, the slider 428A indicates an intensity of 10. The internal illumination menu 404 also includes a user-selectable option 430 for selecting a color of the illumination (e.g., white light, red light, green light, blue light, infrared light, etc), and user-selectable options 432A, 434A, 436A, and 438A for controlling whether to activate illumination sources at the top, right, bottom, and left of the imaging device 104, respectively. An imager representation 440A schematically illustrates the imaging device 104 and whether the top, right, bottom, and left illumination sources are activated. In FIG. 4A, all user-selectable options 432A, 434A, 436A, and 438A are toggled in the "on" position. Accordingly, the imager representation 440A schematically illustrates light originating from each of the four illumination sources. Each illumination source of the imager device 104 may correspond to a certain number of active light sources (i.e., LEDs). Accordingly, by changing whether the right, left, bottom, and top illumination sources are activated, a user can change the number of activated light sources.

The maximum exposure time 410A and the maximum intensity 426 may represent the maximum allowable settings calculated by the imaging device 104 based on the power source of the imaging device 104, using the method 300. A user is prevented from selecting an exposure or an intensity larger than the maximum exposure time 410A or the maximum intensity 426, respectively. As one example, the user may select the user-selectable options 432A, 434A, 436A, and 438A such that all illumination sources of the imaging device 104 are active. Thus, in an example implementation, the imaging device 104 fixes the number of active light sources based on the user selection of the four illumination sources, and adjusts the maximum exposure time 410A and the maximum intensity 426 available to the user based on the fixed number of active light sources. As another example, the imaging device 104 may fix the number of active light sources and the intensity based on user selections, and adjust the maximum exposure setting available to the user based on the fixed number of active light sources and fixed intensity. FIGS. 4B-4C are example imaging configuration screens based on this second example, in which the maximum exposure time available to the user is varied by the system in response to user selections of illumination sources and intensity.

Turning to FIG. 4B, on a second imaging configuration screen 400B, a user may toggle the user-selectable options for the four illumination sources. The user may toggle the user-selectable options 432B and 436B for the top and bottom illumination sources to the "on" position, and the user-selectable options 434B and 438B for the right and left illumination sources to the "off" position. Responsive to the selections of the user-selectable options 434B and 438B, the imager representation 440B may indicate that the right and left illumination sources are not activated. The slider 428B for the intensity setting 422 remains unchanged from FIG.

4A. After the user changes the user-selectable options 434B and 438B, the imaging device 104 calculates the maximum allowable exposure based on the user-selected number of active light sources and user-selected intensity. Accordingly, the maximum exposure 410B increases from 1.7 ms to 4 ms because there are fewer activated light sources in comparison to FIG. 4A. Due to the decreased number of active light sources, the remaining power budget for the exposure time increases.

Turning to FIG. 4C, on a third imaging configuration screen 400C, a user may lower the selected intensity from 10 to 5 by interacting with the slider 428C. The user-selectable options 432C, 434C, 436C, and 438C and the imager representation 440C remain unchanged from FIG. 4B. Accordingly, the maximum exposure 410C increases from 1.7 ms in FIG. 4A and 5 ms in FIG. 4B to 9.4 ms. Due to the decreased intensity for the same number of light sources (in comparison to FIG. 4B), the remaining power budget for the exposure time increases.

Figure 5:
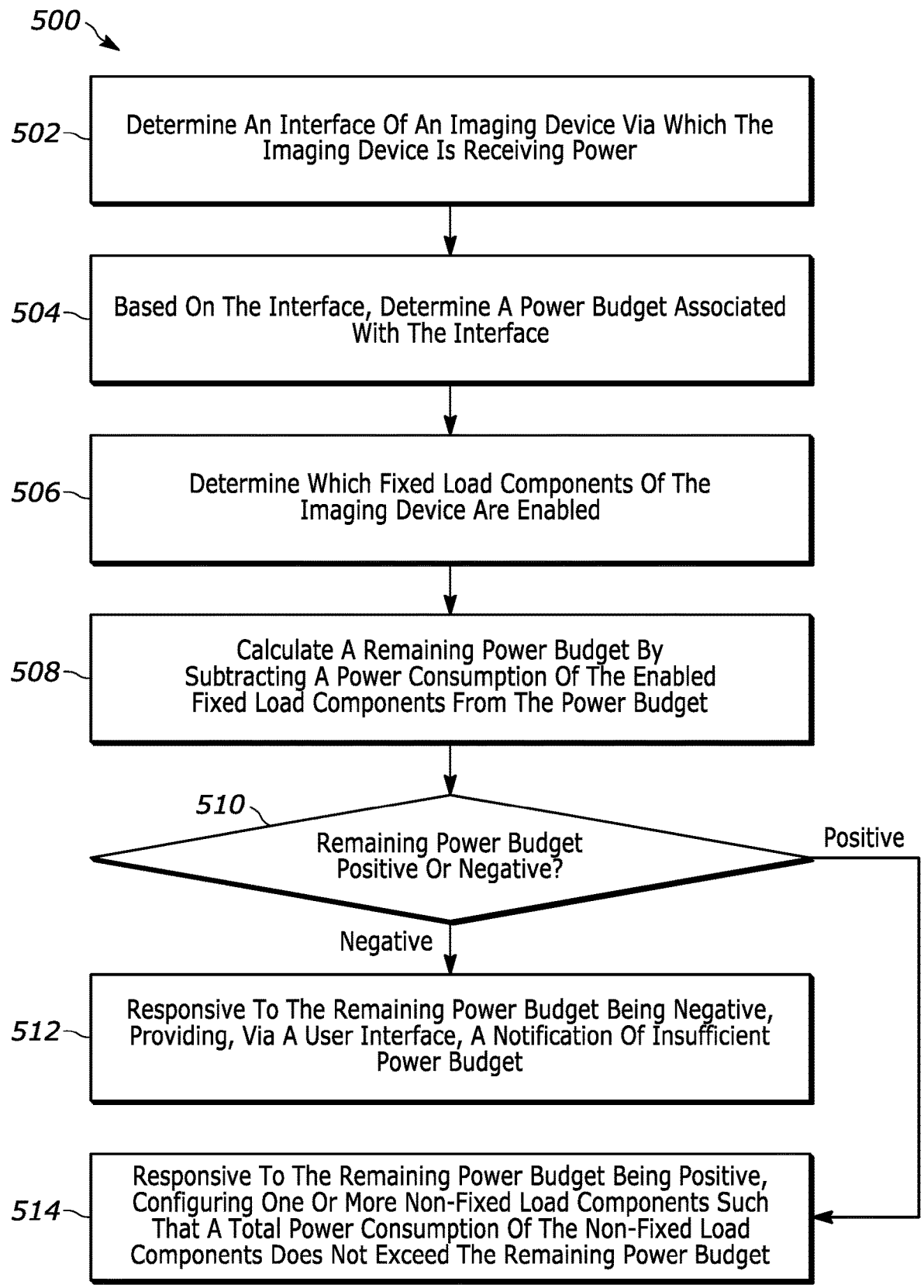
FIG. 5 illustrates a flow diagram of an example method for managing power within an imaging device, which can be implemented by the system of FIG. 1.

FIG. 5 illustrates a flow diagram of an example method 500 for managing power within an imaging device (e.g., the imaging device 104), which can be implemented by the imaging device, or by a system including the imaging device and a user computing device (e.g., the user computing device 102). At block 502, the imaging device determines an interface of the imaging device via which the imaging device is receiving power. The imaging device may have more than one interface via which the imaging device is capable of receiving power. In such cases, the imaging device determines which of these interfaces is actively receiving power. In some implementations, the imaging device determines the interface at power up of the imaging device.

At block 504, the imaging device determines, based on the interface, a power budget associated with the interface. Determining the power budget may include using a lookup table to identify the power budget associated with the identified interface. Responsive to determining that the interface is an external power supply interface, the imaging device may measure a voltage at the interface (e.g., to confirm a power received from the external power supply interface).

At block 506, the imaging device determines which fixed load components of the imaging device are enabled. Determining which fixed load components are enabled may include determining whether one or more of an ethernet port, a USB port, a display port, or a GPIO port are in a connected state. Further, determining which fixed load components are enabled may include determining which sensors (e.g., imaging sensors, such as color or monochrome imaging sensors) are enabled.

At block 508, the imaging device calculates a remaining power budget by subtracting a power consumption of the enabled fixed load components from the power budget.

At block 510, the imaging device determines whether the remaining power budget is positive or negative. Responsive to the remaining power budget being negative, the imaging device at block 512 provides, via a user interface (e.g., a user interface of the smart imaging application 116 displayed by the user computing device 102), a notification of insufficient power budget. Responsive to the remaining power budget being positive (or zero, in some cases), the imaging device at block 514 configures one or more non-fixed load components such that a total power consumption of the non-fixed load components does not exceed the remaining power budget.

Configuring the non-fixed load components at block 514 may include configuring an illumination assembly (e.g., the illumination assembly 128) of the imaging device. Configuring the illumination assembly may include determining a combination of settings including an exposure time, a number of activated light sources, and an intensity of the illumination assembly such that the total power consumption does not exceed the remaining power budget, and varying the illumination assembly, via a controller (e.g., a controller including the processor 118), in accordance with the combination of settings. Determining the combination of settings may include determining the combination of settings leaving one or two or the exposure time, the number of activated light sources, or the intensity fixed. In some implementations, the imaging device receives a selection of one or two of the exposure time, the number of activated light sources, or the intensity via the user interface, and, responsive to the selection, determining the combination of settings leaving the one or two of the exposure time, the number of activated light sources, or the intensity fixed. The imaging device can provide, via the user interface, an indication of the combination of settings.

Configuring the illumination assembly may include determining a maximum exposure time for the illumination assembly based on the remaining power budget, and preventing (e.g., via a controller of the imaging device and/or by modifying the user interface such that exposure times above the maximum exposure time cannot be selected by a user) the illumination assembly from operating with an exposure time exceed the maximum exposure time. The imaging device may also provide, via the user interface, an indication of the maximum exposure time. Similarly, the imaging device may determine a maximum number of light sources of the illumination assembly that can be activated and/or a maximum intensity of the illumination assembly, based on the remaining power budget. The imaging device may prevent the illumination assembly from operating with a number of light sources exceeding the maximum number of light sources or intensity exceeding the maximum intensity, and provide an indication of these maximums via the user interface.

Further, in some implementations, the imaging device detects a change in the enabled fixed load components and, responsive to the detecting, recalculates the remaining power budget. Additionally or alternatively, the imaging device may detect a change in the interface over which the imaging device is receiving power, and responsive to the detecting, recalculate the remaining power budget.

ADDITIONAL CONSIDERATIONS

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. A method for managing power within an imaging device, the method comprising:
   determining an interface of the imaging device via which the imaging device is receiving power;
   based on the interface, determining a power budget associated with the interface;
   determining which fixed load components of the imaging device are enabled;
   calculating a remaining power budget by subtracting a power consumption of the enabled fixed load components from the power budget;
   responsive to the remaining power budget being positive, configuring one or more non-fixed load components such that a total power consumption of the non-fixed load components does not exceed the remaining power budget; and
   responsive to the remaining power budget being negative, providing, via a user interface, a notification of insufficient power budget.

2. The method of claim 1, wherein the determining the interface includes:
   determining the interface at power up of the imaging device.

3. The method of claim 1, wherein the determining the power budget includes:
   responsive to determining that the interface is an external power supply interface, measuring a voltage at the interface.

4. The method of claim 1, wherein responsive to the remaining power budget being positive, the configuring the one or more non-fixed load components includes:
   configuring an illumination assembly of the imaging device.

5. The method of claim 4, wherein the configuring the illumination assembly includes:
   determining a combination of settings including an exposure time, a number of activated light sources, and an intensity of the illumination assembly such that the total power consumption does not exceed the remaining power budget; and
   varying the illumination assembly, via a controller, in accordance with the combination of settings.

6. The method of claim 5, wherein the determining the combination of settings includes:
   determining the combination of settings leaving one of the exposure time, the number of activated light sources, or the intensity fixed.

7. The method of claim 5, wherein the determining the combination of settings includes:
   determining the combination of settings leaving two of the exposure time, the number of activated light sources, or the intensity fixed.

8. The method of claim 5, wherein the determining the combination of settings includes:
   receiving a selection of one or two of the exposure time, the number of activated light sources, or the intensity via the user interface; and
   responsive to the selection, determining the combination of settings leaving the one or two of the exposure time, the number of activated light sources, or the intensity fixed.

9. The method of claim 5, further comprising:
   providing, via the user interface, an indication of the combination of settings.

10. The method of claim 4, wherein the configuring the illumination assembly includes:
    determining a maximum exposure time for the illumination assembly based on the remaining power budget; and
    preventing the illumination assembly from operating with an exposure time exceeding the maximum exposure time.

11. The method of claim 10, further comprising:
    providing, via the user interface, an indication of the maximum exposure time.

12. The method of claim 4, wherein the configuring the illumination assembly includes:
    determining a maximum number of light sources of the illumination assembly that can be activated based on the remaining power budget; and
    preventing the illumination assembly from operating with a number of light sources exceeding the maximum number of light sources.

13. The method of claim 12, further comprising:
    providing, via the user interface, an indication of the maximum number of light sources.

14. The method of claim 4, wherein the configuring the illumination assembly includes:
    determining a maximum intensity of the illumination assembly based on the remaining power budget; and
    preventing the illumination assembly from operating with an intensity exceeding the maximum intensity.

15. The method of claim 14, further comprising:
    providing, via the user interface, an indication of the maximum intensity.

16. The method of claim 1, further comprising:
    detecting a change in the enabled fixed load components; and
    responsive to the detecting, recalculating the remaining power budget.

17. The method of claim 1, wherein the determining which fixed load components are enabled includes:
    determining whether one or more of an ethernet port, a Universal Serial Bus (USB) port, a display port, or a General Purpose Input/Output (GPIO) port are in a connected state.

18. The method of claim 1, wherein the determining which fixed load components are enabled includes:
    determining which sensors of the imaging device are enabled.

19. A system comprising:
    an imaging device;
    a computing device implementing a user interface and communicatively coupled to the imaging device;
    the imaging device configured to:
       determine an interface of the imaging device via which the imaging device is receiving power;
       based on the interface, determine a power budget associated with the interface;
       determine which fixed load components of the imaging device are enabled;
       calculate a remaining power budget by subtracting a power consumption of the enabled fixed load components from the power budget;
       responsive to the remaining power budget being positive, configure one or more non-fixed load components such that a total power consumption of the non-fixed load components does not exceed the remaining power budget; and
       responsive to the remaining power budget being negative, transmit an indication to the computing device to cause the user interface to display a notification of insufficient power budget.

20. An imaging device comprising one or more processors configured to:
- determine an interface of the imaging device via which the imaging device is receiving power;
- based on the interface, determine a power budget associated with the interface;
- determine which fixed load components of the imaging device are enabled;
- calculate a remaining power budget by subtracting a power consumption of the enabled fixed load components from the power budget;
- responsive to the remaining power budget being positive, configure one or more non-fixed load components such that a total power consumption of the non-fixed load components does not exceed the remaining power budget; and
- responsive to the remaining power budget being negative, transmit a notification of insufficient power budget to a computing device.

* * * * *